United States Patent [19]

Homan et al.

[11] 4,347,336

[45] Aug. 31, 1982

[54] HEAT CURED SILICONE ELASTOMER

[75] Inventors: Gary R. Homan; Charles A. Romig, both of Midland, Mich.

[73] Assignee: Dow Corning Corporation, Midland, Mich.

[21] Appl. No.: 310,025

[22] Filed: Oct. 13, 1981

[51] Int. Cl.³ .............................................. C08L 83/04
[52] U.S. Cl. ...................................... 524/731; 528/24; 528/32; 528/34; 528/901; 427/387; 427/388.1; 428/447; 428/450; 524/588
[58] Field of Search ................... 528/34, 32, 24, 901; 260/37 SB; 427/387, 388.1; 428/447, 450

[56] References Cited

U.S. PATENT DOCUMENTS

| | | | |
|---|---|---|---|
| 2,876,234 | 3/1959 | Hurwitz et al. | 260/326.5 |
| 3,364,160 | 1/1968 | Golitz et al. | 528/34 |
| 3,378,520 | 4/1968 | Sattlegger et al. | 528/901 |
| 3,417,047 | 12/1968 | Golitz et al. | 528/34 |
| 4,012,375 | 3/1977 | Hahn | 528/34 |
| 4,020,044 | 4/1977 | Crossan et al. | 260/46.5 UA |

Primary Examiner—Melvyn I. Marquis
Attorney, Agent, or Firm—Roger H. Borrousch

[57] ABSTRACT

A composition comprising a hydroxyl endblocked polydiorganosiloxane, methylvinylsilyl-bis-pyrrolidone, and organic peroxide will simultaneously chain extend and crosslink when heated. The composition can be prepared with a low viscosity polydiorganosiloxane to yield a low viscosity composition useful for coating, impregnating, and forming operations. Because the polymer chain extends as well as crosslinks during cure, the physical properties of the cured elastomer are superior to those of a low viscosity polymer which is merely crosslinked to an elastomer.

12 Claims, No Drawings

HEAT CURED SILICONE ELASTOMER

BACKGROUND OF THE INVENTION

1. Field of the Invention

This invention relates to silicone elastomer compositions, the process of producing them, and the cured product.

2. Description of the Prior Art

Low viscosity silicone elastomer compositions have been used as mold-making materials, potting and encapsulating materials, and injection molding materials. A low viscosity is useful in such applications as it allows the composition to easily coat the surfaces against which it is placed and to flow into extremely small spaces. When using low viscosity polymers, it is difficult to obtain physical strength properties of the desired levels due to the low molecular weight of the polymers.

A method of increasing the molecular weight of a hydroxyl endblocked polydiorganosiloxane has been disclosed by Crossan and Toporcer in U.S. Pat. No. 4,020,044, issued Apr. 26, 1977. They disclose that mixing a silane of the formula

with a hydroxyl endblocked polydiorganosiloxane will yield a higher molecular weight material that will have vinyl functionality distributed along the chain which can be used for further reactions, such as curing reactions. They teach that when this material and a hydroxyl endblocked polydiorganosiloxane are mixed together, the mixture reacts very rapidly with the reaction going to completion at room temperature in a short period of time. Such a mixture would have a short shelf life after mixing and would be unsuitable for use in applications where it is necessary for the mixture to be a low viscosity during the placement and forming operations before cure. Such a mixture would be unsatisfactory in an operation such as impregnating a large electrical coil where the viscosity must be low to allow the material to flow between all the wires and where the working time must be long enough to allow complete impregnation of the entire coil before the viscosity rises to a significantly higher level.

A class of compounds of the formula

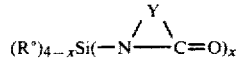

is disclosed in U.S. Pat. No. 2,876,234, issued Mar. 3, 1959, by Hurwitz and deBenneville where R° is a cyclohexyl group, aryl group, alkenyl group, or an alkyl group of 1 to 18 carbon atoms; Y is an alkylene group having 3 to 18 carbon atoms with a chain of at least 3 but no more than 5 carbon atoms extending between the N atom and the carbonyl group; and x is an integer having a value of 1 to 4. They teach the compounds may be pesticides. The compounds may be polymerized to produce fusible products which may be applied to leather, paper pulp, fabrics, or nonfibrous sheets and heated to produce an infusible condition.

SUMMARY OF THE INVENTION

A composition comprising a low viscosity hydroxyl endblocked polydiorganosiloxane, a silane of the formula

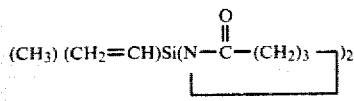

herein also referred to as methylvinylsilyl-bis-pyrrolidone, and an organic peroxide can be mixed together to yield a mixture with a viscosity low enough to flow easily. The mixture has a pot life after mixing that is sufficiently long to allow the mixture to be impregnated into small voids before there is an appreciable change in viscosity. This is not true of similar mixtures prepared with other silanes used as chain extenders. Upon heating, the silane reacts with the polydiorganosiloxane as a chain extending agent increasing the molecular weight of the resulting polymer. The organic peroxide is activated when heated to cause a crosslinking reaction that results in a cured polymer. The physical characteristics of the cured composition are more typical of those found using a high molecular weight, high viscosity polymer or gum rather than the physical properties usually associated with lower molecular weight fluids such as those used as a starting material in this invention.

The specific silane used as a chain extension agent in this invention is unique in its action. The presence of the vinyl group allows the composition to be cured with an organic peroxide by heating to yield a cross-linked silicone elastomer in a manner well known in the art. The two pyrrolidone groups of the silane can react with the hydroxyl radicals at the ends of the polydiorganosiloxane molecule to link molecules together to yield high molecular weight molecules. The reactivity of the pyrrolidone group with the hydroxyl radical is such that the reaction is slow at room temperature but can be accelerated at elevated temperature to react in a useful time. The reaction rate of the chain extension and of the crosslinking are such that both can be carried out simultaneously to yield a cured silicone elastomer with improved physical properties.

DESCRIPTION OF THE INVENTION

This invention relates to a composition comprising the product obtained by mixing, in the absence of moisture, (A) 100 parts by weight of hydroxyl endblocked polydiorganosiloxane having a viscosity of from 0.07 to 50 Pa.s at 25° C. wherein each organic radical is selected from a group consisting of methyl, ethyl, vinyl, phenyl, and 3,3,3,-trifluorpropyl radicals, there being from 0 to 2 inclusive percent vinyl radicals, from 0 to 50 inclusive percent 3,3,3-trifluoropropyl radicals, and from 0 to 30 inclusive percent phenyl radicals, all percents based on the total number of organic radicals in the polydiorganosiloxane; (B) sufficient

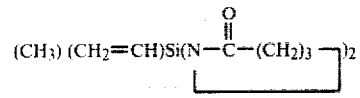

to give from 0.9 to 1.1 moles of (B) for each two moles of hydroxyl radicals in (A), and (C) 0.1 to 5 parts by weight of organic peroxide.

This invention is based upon the unique properties of the methylvinylsilyl-bis-pyrrolidone, represented by the formula

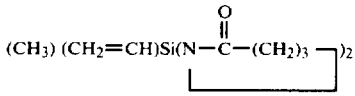

when it reacts with a hydroxyl endblocked polydiorganosiloxane. The reactions thought to occur can be shown as

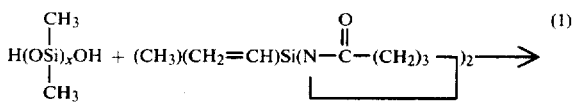

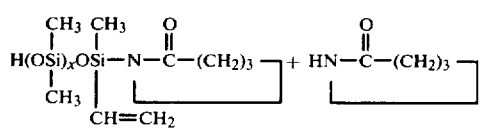

(1)

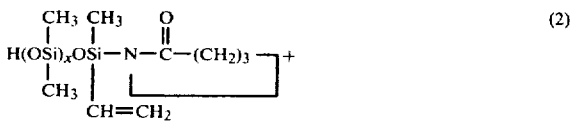

(2)

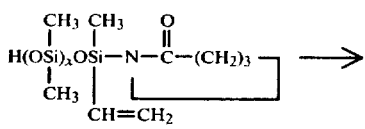

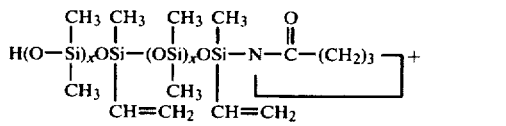

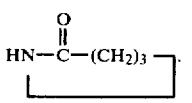

Reaction (2) can continue until theoretically infinite molecular weight is obtained. The same reaction is taking place at both ends of the polydiorganosiloxane.

The silane is a bifunctional compound when reacted with a hydroxyl endblocked polydiorganosiloxane. The reaction rate of the leaving pyrrolidone group with the hydroxyl radical on the polydiorganosiloxane is surprisingly slow at room temperature. When mixed together in the ratio of 2 moles of hydroxyl radical in the polydiorganosiloxane to 1 mole of silane, the viscosity of the mixture remains essentially stable for at least one hour. Other similar groups react much more rapidly. For instance, the

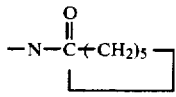

group reacts so quickly at room temperature that a mixture of

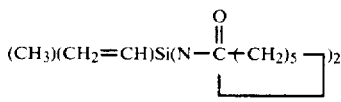

and hydroxyl endblocked polydiorganosiloxane increases in viscosity to about 25 times the starting viscosity in only 10 minutes at room temperature. A similar mixture using

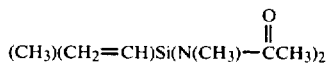

reacts at a similarly rapid rate. The use of such rapidly reacting silanes would not be practical in the applications intended for this invention because the useful pot life of such compositions would be very short.

The reaction rate between the hydroxyl radical on the polydiorganosiloxane and the pyrrolidone group of the silane can be accelerated by heating. At the temperatures normally used to activate the common organic peroxides useful for curing silicone elastomers, the chain extending reaction between the polydiorganosiloxane and the silane is rapid enough to yield a high molecular weight polymer in the time necessary for the curing to take place.

The methyl and vinyl groups attached to the silicon atom in the silane are also critical in the composition of this invention. The unsaturated vinyl group allows reaction between the vinyl group on one polymer molecule and the vinyl or methyl group on another polymer molecule, when catalyzed with the organic peroxide and heated, to create crosslinking between molecules. These reactions yield a cured, cross-linked elastomer.

The silane herein specified, methylvinylsilyl-bis-pyrrolidone, simultaneously allows a chain extension reaction converting a relatively low molecular weight polydiorganosiloxane into a high molecular weight polymer and a crosslinking reaction converting a high molecular weight polymer into a cross-linked elastomer.

The methylvinylsilyl-bis-pyrrolidone used in this invention can be prepared as shown in U.S. Pat. No. 2,876,234 which is hereby incorporated by reference to show method of preparation. A preferred method is the anhydrous reaction of two moles of pyrrolidone.

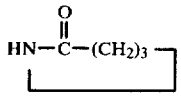

with one mole of methylvinyldichlorosilane, $(CH_3)(CH_2=CH)SiCl_2$, in the presence of triethylamine in a toluene mixture. After reaction, the product is vacuum stripped and then vacuum distilled using a Vigreux column to yield the purified product.

The hydroxyl endblocked polydiorganosiloxane (A) can have a viscosity at 25° C. of from 0.07 to 50 Pa.s, preferably from 1.0 to 15 Pa.s. The hydroxyl endblocked polydiorganosiloxane has organic groups selected from methyl, ethyl, vinyl, phenyl, and 3,3,3-trifluoropropyl radicals. The organic groups of the polydiorganiosiloxane contains no more than 30 percent phenyl or 50 percent 3,3,3-trifluoropropyl radicals and no more than 2 percent vinyl radicals based on the total number of organic radicals in the polydiorganosiloxane. Other monovalent hydrocarbon radicals and halogenated monovalent hydrocarbon radicals in small amounts can be present in the polydiorganosiloxane. The diorganosiloxane units of the hydroxyl endblocked polydiorganosiloxane can be, for example, dimethylsiloxane, diethylsiloxane, ethylmethylsiloxane, diphenylsiloxane, methylphenylsiloxane, methylvinylsiloxane and 3,3,3-trifluoropropylmethylsiloxane. The term polydiorganosiloxane as used herein does not preclude small amounts of other siloxane units such as monoorganosiloxane units. The hydroxyl endblocked polydiorganosiloxanes are known in the art and can be made by known commercial methods. The preferred hydroxyl endblocked polydiorganosiloxane is hydroxyl endblocked polydimethylsiloxane.

The composition of this invention contains an organic peroxide vulcanizing agent suitable for vulcanizing the composition. Since the composition contains vinyl radicals, it can be vulcanized with either "non-vinyl specific" or "vinyl specific" organic peroxides. Representative of "non-vinyl specific" organic peroxides are benzoylperoxide, dicumylperoxide, and 2,4-dichlorobenzoylperoxide. Representative of the "vinyl specific" organic peroxides are ditertiary-butylperoxide, tertiary-butylperbenzoate, and 2,5-bis-(tert-butylperoxy)-2,5-dimethylhexane. All these organic peroxides and their properties are well known in the art. The properties of the cured composition can be altered by the type and amount of vulcanizing agent used to cure the composition. Typical changes due to such choices are well recognized in the art. The vulcanizing agent can be present in amounts of from 0.1 part to 5 parts by weight per 100 parts of polydiorganosiloxane, preferably from 0.2 to 2.0 parts by weight.

The compositions of this invention can also contain fillers. The fillers can be present in amounts of from 0 to 200 parts by weight per 100 parts by weight of polydiorganosiloxane, preferably from 10 to 125 parts by weight filler per 100 parts by weight of polydiorganosiloxane. These fillers can be any nonacidic, nonreinforcing filler and include, for example, calcium carbonate, ferric oxide, nonacidic carbon black, diatomaceous earth, alumina, titanium dioxide, glass microballoons, organic fillers, resins, such as silicone resins, crushed quartz, calcium sulfate, and the like. Other conventional additives can be used, as long as they are neutral or basic, including pigments, dyes, antioxidants, heat stability additives, and the like.

The mixing step used to prepare a composition of this invention can be any suitable means that will yield a homogeneous mixture of the several components. It can be as simple as stirring by hand in a container, particularly when the polydiorganosiloxane is a lower viscosity. For the higher viscosity polymer, and when fillers are used in the composition, mechanical mixing methods are more suitable. Because the methylvinylsilyl-bis-pyrrolidone will react with moisture, it is desirable to have the ingredients, particularly the fillers, in a reasonably dry condition. The mixing of the composition after the methylvinylsilyl-bis-pyrrolidone is present should not expose the ingredients to moisture. If the composition is made as two parts, the part containing the methylvinylsilyl-bis-pyrrolidone should be stored in a moisture-proof container.

If the composition is to be formed and vulcanized soon after mixing, all of the critical ingredients can be mixed in any desired order. The useful life after mixing the composition is sufficient to allow mixing, forming, and vulcanizing in a commercial manner without difficulty due to an increase in the viscosity of the composition after mixing is completed.

When the period between mixing and use is unknown, it is possible to prepare the composition as a two-part system. The polydiorganosiloxane, organic peroxide, optionally filler, and any other additives used can be mixed together to make one of the parts. The silane alone can be the other part or the silane can be mixed with some of the filler or other additives used. The two parts would then be mixed together before use in any of the conventional methods commonly used in the art. The low viscosity of the composition allows the use of such commercial mixers as static mixers to be used for continuous mixing type operations by merely pumping the two parts through the mixer in the correct ratio. The long pot life of the composition after mixing precludes any problems caused by a rise in viscosity of the composition during the mixing, forming, and curing steps.

The low viscosity composition of this invention allows it to be used in such applications as impregnation of electrical coils. A coil would normally be placed in a container, then placed under vacuum to remove air from the voids in the coil. The composition of this invention would be poured into the container while still under vacuum, then the vacuum would be removed allowing the composition to flow into all voids and completely impregnate the coil. Then the coil and container would be placed in an oven to cause the composition to simultaneously chain extend and cure. The resultant cured silicone elastomer would have the physical properties of a high molecular weight gum type polymer, rather than the physical properties of a low molecular weight polymer.

Another application for this composition is the formation of mold of finely detailed objects. The use of silicone elastomers for molds is well established. The composition of this invention allows the low viscosity necessary to insure that the mold-forming material will flow into all the detail on the surface of the pattern, during the process of forming the mold. By then heating the resulting assembly, the simultaneous chain extension and crosslinking processes yield a cured silicone elastomer mold that has superior physical properties and that also gives exact reproduction of the surface characteristics of the pattern.

The compositions can also be formed to a desired configuration before curing by any of the well-known methods of forming elastomeric curable compositions such as press molding, injection molding, calendering, and extruding.

The compositions of this invention are vulcanized by heating. The time and temperature necessary to cause vulcanization of the composition is dependent upon the organic peroxide vulcanizing agent chosen, the method of heating, the method of shaping the composition to the desired configuration, and the thickness of the part. The temperature that is appropriate for a given set of conditions is well known to those familiar with the art. Typical temperatures are from 110° C. to 175° C. for molding operations, and as high as 300° C. for hot-air ovens used in continuous vulcanization operations used in conjunction with extrusion processes. The times necessary are dependent upon the temperature chosen and the size of the part being heated. The composition must be heated above the activation temperature of the organic peroxide catalyst and time must be long enough to allow this to happen.

The compositions of this invention are useful in those applications which require a relatively low viscosity during the forming step such as those applications discussed above. Molding and extruding operations can be carried out at low operating pressures because of the low viscosity of the composition before vulcanization. After heating to cause both chain extension and crosslinking, the cured products have physical properties typical of those compositions manufactured from high viscosity gum type polymers rather than the lower physical properties expected from compositions manufactured of low viscosity polymers such as those used in the instant invention.

The following examples are included for illustrative purposes only and should not be construed as limiting the invention which is properly delineated by the claims. All parts are parts by weight. Methyl and vinyl radicals are represented by Me and Vi.

EXAMPLE 1

A mixture comprising 10 g of a hydroxyl endblocked polydimethylsiloxane with a viscosity of about 4 Pa.s and 0.12 percent by weight hydroxyl radical ($7.06 \times 10^{-4}$ mole hydroxyl radical), 0.084 g of

chain extender ($3.53 \times 10^{-4}$ mole), and 0.05 g t-butylperbenzoate was mixed in an aluminum dish and then cured by heating for 10 minutes at 150° C. in a hot-air oven. The mixture cured to a tightly crosslinked elastomer with a tacky surface due to inhibition of the cure by air.

The experiment was repeated, placing a piece of polytetrafluoroethylene film on the surface to prevent contact with the air. When cured as above, the surface was no longer tacky.

EXAMPLE 2

The mixture of Example 1 was repeated except that the t-butylperbenzoate was not added.

After the oven cure, the mixture was found to have changed from a low viscosity fluid to a gum with no crosslinking apparent. The surface was tacky.

This experiment was repeated, placing a piece of polytetrafluoroethylene film on the surface to prevent contact with the air. When cured as above, the surface was still tacky because it was a gum.

EXAMPLE 3

A similar bifunctional chain extender without the vinyl group was used to illustrate the importance of the vinyl group in obtaining crosslinking when using a vinyl specific organic peroxide.

A mixture comprising 10 g of the polydimethylsiloxane of Example 1, 0.1 g of

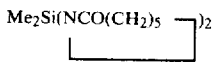

chain extender ($3.54 \times 10^{-4}$ mole), and 0.05 g t-butylperbenzoate was prepared in an aluminum dish, covered with a polytetrafluoroethylene film, and cured for 10 minutes at 150° C. in a hot-air oven. The mixture cured to a gum with no apparent crosslinking, rather than curing to an elastomer as in Example 1 when vinyl radical was present.

When the experiment was repeated without the peroxide, the mixture again produced a gum when heated.

EXAMPLE 4

A experiment was performed to illustrate the uniqueness of the

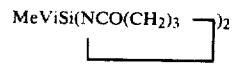

used in the instant invention.

A method of measuring the viscosity of fluids known as the Falling Ball Viscometry test was used to measure the reaction rate between a hydroxyl endblocked polydimethylsiloxane and various bifunctional chain extending materials. A steel ball, 6.35 mm in diameter, was placed in a vial, 25.4 mm in diameter, and the vial filled with fluid and sealed. The vial was then turned over and the time for the ball to fall 25.4 mm noted. The falling rate of the ball in a variety of polydiorganosiloxane fluids of known viscosity was measured and plotted. The straight-line relationship was then used to calculate the viscosity of the experimental mixtures under test.

To perform the experiment, 0.0035 mole of a hydroxyl endblocked polydimethylsiloxane of 4 Pa.s viscosity was mixed with 0.0019 mole of the chain extender shown in the Table below. The viscosity was then measured at various times. The results below show that the

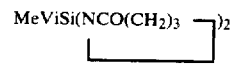

is uniquely suited to the instant invention because it does not cause a viscosity rise at room temperature. A mixture containing this chain extender has a useful pot life after mixing.

| Chain Extender | Time, minutes | | | | |
| --- | --- | --- | --- | --- | --- |
| | 0 | 10 | 20 | 30 | 60 |
| | Viscosity, Pa.s | | | | |
| MeViSi(NCO(CH$_2$)$_3$ —)$_2$ | 4 | 4 | 4 | 4 | 4.5 |
| MeViSi(NCO(CH$_2$)$_5$ —)$_2$ | 4 | 90 | 500 | — | — |
| Me$_2$Si(NCO(CH$_2$)$_5$ —)$_2$ | 4 | 10 | 30 | 70 | 110 |

That which is claimed is:

1. A composition comprising the product obtained by mixing, in the absence of moisture,
   (A) 100 parts by weight of hydroxyl endblocked polydiorganosiloxane having a viscosity of from 0.07 to 50 Pa.s at 25° C. wherein each organic radical is selected from a group consisting of methyl, ethyl, vinyl, phenyl, and 3,3,3-trifluoropropyl radicals, there being from 0 to 2 inclusive percent vinyl radicals, from 0 to 50 inclusive percent 3,3,3-trifluoropropyl radicals, and from 0 to 30 percent inclusive phenyl radicals, all percents based on the total number of organic radicals in the polydiorganosiloxane;

(B) sufficient

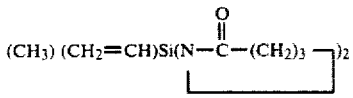

to give from 0.9 to 1.1 moles of (B) for each two moles of hydroxyl radical in (A), and (C) 0.1 to 5 parts by weight of organic peroxide.

2. The composition in accordance with claim 1 in which there is also present from 1 to 200 parts by weight of filler.

3. The composition of claim 2 in which the filler is present in an amount of from 10 to 125 parts by weight.

4. The composition in accordance with claim 1 in which the polydiorganosiloxane has a viscosity at 25° C. of from 1.0 to 15 Pa.s.

5. A process consisting essentially of
(1) mixing, in the absence of moisture, a composition comprising the product obtained by mixing
    (A) 100 parts by weight of hydroxyl endblocked polydiorganosiloxane having a viscosity of from 0.07 to 50 Pa.s at 25° C. wherein each organic radical is selected from a group consisting of methyl, ethyl, vinyl, phenyl, and 3,3,3-trifluoropropyl radicals, there being from 0 to 2 inclusive percent vinyl radicals, from 0 to 50 inclusive percent 3,3,3-trifluoropropyl radicals, and from 0 to 30 inclusive percent phenyl radicals, all percents based on the total number of organic radicals in the polydiorganosiloxane;
    (B) sufficient

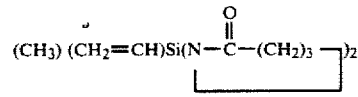

to give from 0.9 to 1.1 moles of (B) for each 2 moles of hydroxyl radical in (A), and
    (C) 0.1 to 5 parts by weight of organic peroxide, to yield a composition,
(2) forming the composition into a shape in a location,
(3) heating the composition to a temperature above the activation temperature of the organic peroxide for a time sufficient to yield a cured elastomer.

6. The process in accordance with claim 5 in which the composition also contains from 1 to 200 parts of filler.

7. The process in accordance with claim 5 in which the filler is present in an amount of from 10 to 125 parts by weight.

8. The process in accordance with claim 5 in which the polydiorganosiloxane has a viscosity at 25° C. of from 1.0 to 15 Pa.s.

9. The cured elastomer of claim 5.
10. The cured elastomer of claim 6.
11. The cured elastomer of claim 7.
12. The cured elastomer of claim 8.

* * * * *